(12) United States Patent
Kamiya et al.

(10) Patent No.: US 7,184,116 B2
(45) Date of Patent: Feb. 27, 2007

(54) LCD HAVING AN ALIGNMENT FILM COMPRISING SINTERED CARBON

(75) Inventors: Hiroyuki Kamiya, Kanagawa-ken (JP); Yoshimine Katoh, Sagamihari (JP)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 09/908,194

(22) Filed: Jul. 18, 2001

(65) Prior Publication Data

US 2002/0097360 A1    Jul. 25, 2002

(30) Foreign Application Priority Data

Jul. 28, 2000    (JP)    ............................. 2000-228748

(51) Int. Cl.
*G02F 1/1337* (2006.01)
(52) U.S. Cl. ....................................... 349/123; 349/124
(58) Field of Classification Search ................ 349/191, 349/123, 124
See application file for complete search history.

(56) References Cited

U.S. PATENT DOCUMENTS

| | | | | |
|---|---|---|---|---|
| 4,626,073 A | * | 12/1986 | Amstutz et al. ............. | 349/155 |
| 5,013,139 A | * | 5/1991 | Kaganowicz et al. ....... | 349/125 |
| 5,256,456 A | * | 10/1993 | Ogawa ....................... | 428/1.23 |
| 5,567,512 A | * | 10/1996 | Chen et al. ................ | 428/332 |
| 5,579,141 A | * | 11/1996 | Suzuki et al. .............. | 349/124 |
| 5,742,370 A | * | 4/1998 | Kim et al. .................. | 324/205 |
| 5,864,452 A | * | 1/1999 | Hirano et al. ............... | 360/122 |
| 6,020,946 A | * | 2/2000 | Callegari et al. ........... | 349/124 |
| 6,417,900 B1 | * | 7/2002 | Shin et al. .................. | 349/110 |
| 6,548,173 B2 | * | 4/2003 | Erdemir et al. ............. | 428/408 |
| 6,549,252 B1 | * | 4/2003 | Lee et al. ..................... | 349/47 |
| 6,621,535 B1 | * | 9/2003 | Fukada ........................ | 349/40 |
| 2002/0054965 A1 | * | 5/2002 | Ogawa ..................... | 428/1.23 |

FOREIGN PATENT DOCUMENTS

JP        61-195178        *  8/1986
JP        02259725 A       * 10/1990

OTHER PUBLICATIONS

Machine translated Abstract of JP 2-259725A to Kimura et al.*
Kaufman et al., "Technology and applications of broad-beam ion sources used in sputtering", Sep. 1982, Journal of Vacuum Science and Technology, vol. 21 Issue 3, pp. 725-736.*

* cited by examiner

*Primary Examiner*—Andrew Schechter
*Assistant Examiner*—W. Patty Chen
(74) *Attorney, Agent, or Firm*—Thomas, Kayden, Horstemeyer & Risley

(57) ABSTRACT

To provide a liquid crystal device using carbon films capable of aligning liquid crystal molecules simultaneously with deposition, a manufacturing apparatus of the liquid crystal device, a manufacturing method of the liquid crystal device and a forming method of an alignment film. The liquid crystal device comprises: substrates 1*a* and 1*b* opposing to each other and including electrodes; an optical cell formed between the opposing electrodes; liquid crystal molecules 2 filled in the optical cell; carbon films 5*a* and 5*b* deposited adhered on a side of at least one of the substrates 1*a* and 1*b*, which is exposed to the liquid crystal molecules 2, in order to align the liquid crystal molecules 2.

12 Claims, 8 Drawing Sheets

(b)

(a)

(b)

(a)

(b)

(a)

(b)

(a)

LCD HAVING AN ALIGNMENT FILM COMPRISING SINTERED CARBON

BACKGROUND OF THE INVENTION

1. Field of the Invention

The present invention relates to a liquid crystal device, more particularly, to a liquid crystal device using a carbon film as an alignment film for liquid crystal molecules, a manufacturing apparatus of the liquid crystal device, a manufacturing method of the liquid crystal device and a forming method of the alignment film.

2. Discussion of Related Art

A liquid crystal device has been widely used in recent years, and an application range thereof has been increasingly spread. In general, the liquid crystal device is constituted by electrodes formed of a transparent electrode material such as ITO on a transparent substrate such as glass, liquid crystal molecules are filled between the substrate having the electrodes formed thereon and an opposed substrate, and sealed by a sealing material. On a side of the electrode formed on the substrate, the side facing to the liquid crystal molecules, an alignment film that consists of a material such as a polyimide film and a carbon film is typically formed so that molecules of the liquid crystal can be aligned in the vicinity of the substrate to impart optical characteristics required to the liquid crystal device.

Description will be made for the case of manufacturing such an alignment film. In the case of using an organic film that consists of polyimide or the like, a polyimide precursor such as polyamic acid is coated on a transparent electrode, the polyamic acid is pre-baked, and then cured to form a polyimide film. Since the polyimide film thus formed is not still fully capable of aligning the liquid crystal molecules, a process of rubbing is required to align the liquid crystal molecules.

On the other hand, in the case of forming an alignment film with an inorganic material such as the carbon film, alignment treatment needs to be performed for the carbon film by irradiating with an ion beam (IB) in order to impart a sufficient alignment property thereto, after the carbon film is formed on the transparent electrode by a method such as evaporation, CVD and sputtering. As described above, when the organic film such as the polyimide film or the inorganic film such as the carbon film is used as the alignment film, two different processes, that is, deposition and alignment processing are required in any case, resulting in much process wastefulness from the viewpoint of cost and yield in manufacturing of the liquid crystal device.

As alignment films used in a liquid crystal display, other than the one using the above-described materials, the polyimide film, the carbon film including various structures and the like are proposed. For example, there is also made an attempt, in which a transparent material such as a silicon oxide film and a nitride film is deposited obliquely onto the substrate, and the liquid crystal is aligned by use of a shape of the transparent material physically formed. However, the alignment film formed by such oblique deposition has a too large pretilt angle and a weak anchoring energy (alignment force), thus the alignment film has not been practically used under the present conditions.

The present invention was made in consideration of the above-described problems. The object of the present invention is to provide a liquid crystal device that uses a carbon film including a structure by which liquid crystal molecules can be aligned simultaneously by deposition, the liquid crystal device being manufactured without passing through the two steps of process as described above, an apparatus for manufacturing the liquid crystal device, a manufacturing method of the liquid crystal device and an alignment film forming method.

SUMMARY OF THE INVENTION

In order to solve the foregoing problems, the present inventors studied zealously. As a result, the inventors found out that, a carbon film formed by DC magnetron sputtering under an inert gas atmosphere can be used as an alignment film for a liquid crystal device. An alignment property is sufficient for aligning the liquid crystal molecules with the carbon film at the stage where the deposition is terminated without any further alignment treatment.

Various reasons are conceived why the carbon film has the above-described property is formed. The carbon film formed according to the present invention is presumed to be deposited with an anisotropy along the NS direction of magnets while the deposition. The anisotropy along the NS direction exhibits an effect of binding the liquid crystal molecules, thus, as a result, it is presumed that the liquid crystal molecules are aligned. The carbon film of the present invention was proven to have an extraordinarily high anchoring energy to the liquid crystal molecules in comparison with the alignment film such as the polyimide film, the silicon oxide film and the nitride film, through a measurement with an interface nematic-isotropic point (NI point), and it was found out to be particularly superior as the alignment film.

Specifically, according to the present invention, a liquid crystal device is provided, which comprises; substrates opposing to each other, at least one of which includes an electrode, an optical cell formed between the substrates, liquid crystal molecules filled in the optical cell, and a carbon film deposited on a side of at least one of the substrates, which is exposed to the liquid crystal molecules, in order to align the liquid crystal molecules. In the present invention, the carbon film is formed in an inert gas atmosphere by applying a magnetic field provided by magnets. Moreover, in the present invention, the inert gas is selected from the group consisting of He, Ne, Ar, Kr, Xe and a mixture thereof. Furthermore, in the present invention, the carbon film is formed to have a thickness of 250 nm or less.

Moreover, according to the present invention, there is provided an apparatus for manufacturing a liquid crystal device including substrates opposing to each other, at least one of which includes an electrode, an optical cell formed between the substrates, and liquid crystal molecules held by the optical cell; the manufacturing apparatus comprising a chamber for processing the substrates, a carbon supply source, and DC magnetron sputtering means including magnets for forming the carbon films aligning the liquid crystal molecules on a side of the substrates, which is exposed to the liquid crystal molecules.

Furthermore, according to the present invention, a method for manufacturing a liquid crystal device is provided, which comprises the steps of: arranging substrates to oppose to each other, at least one of which includes an electrode; forming an optical cell between the substrates; allowing the optical cell to hold liquid crystal molecules; and forming a carbon film on a side of at least one of the substrates, which is exposed to the liquid crystal molecules, in order to align the same. In the present invention, the carbon film can be formed in an inert gas atmosphere by applying a magnetic field provided by magnets. Moreover, in the present invention, the inert gas is selected from the group consisting of He, Ne, Ar, Kr, Xe and a mixture thereof. Furthermore, in the present invention, the carbon film is formed to have a thickness of 250 nm or less.

Still further, according to the present invention, the manufacturing method of a liquid crystal device further comprises the steps of: arranging the substrates in a chamber; and depositing the carbon film on the substrate by introducing an inert gas into the chamber and applying a magnetic field provided by magnets, and the deposited carbon film has an alignment property. The carbon film is formed to have a thickness of 250 nm or less. In the present invention, the inert gas can be selected from the group consisting of He, Ne, Ar, Kr, Xe and a mixture thereof.

DETAILED DESCRIPTION OF PREFERRED EMBODIMENT

Hereinbelow, the present invention will be described by exemplifying embodiments with reference to the drawings. However, the present invention is not limited to the embodiments.

Figure 1:
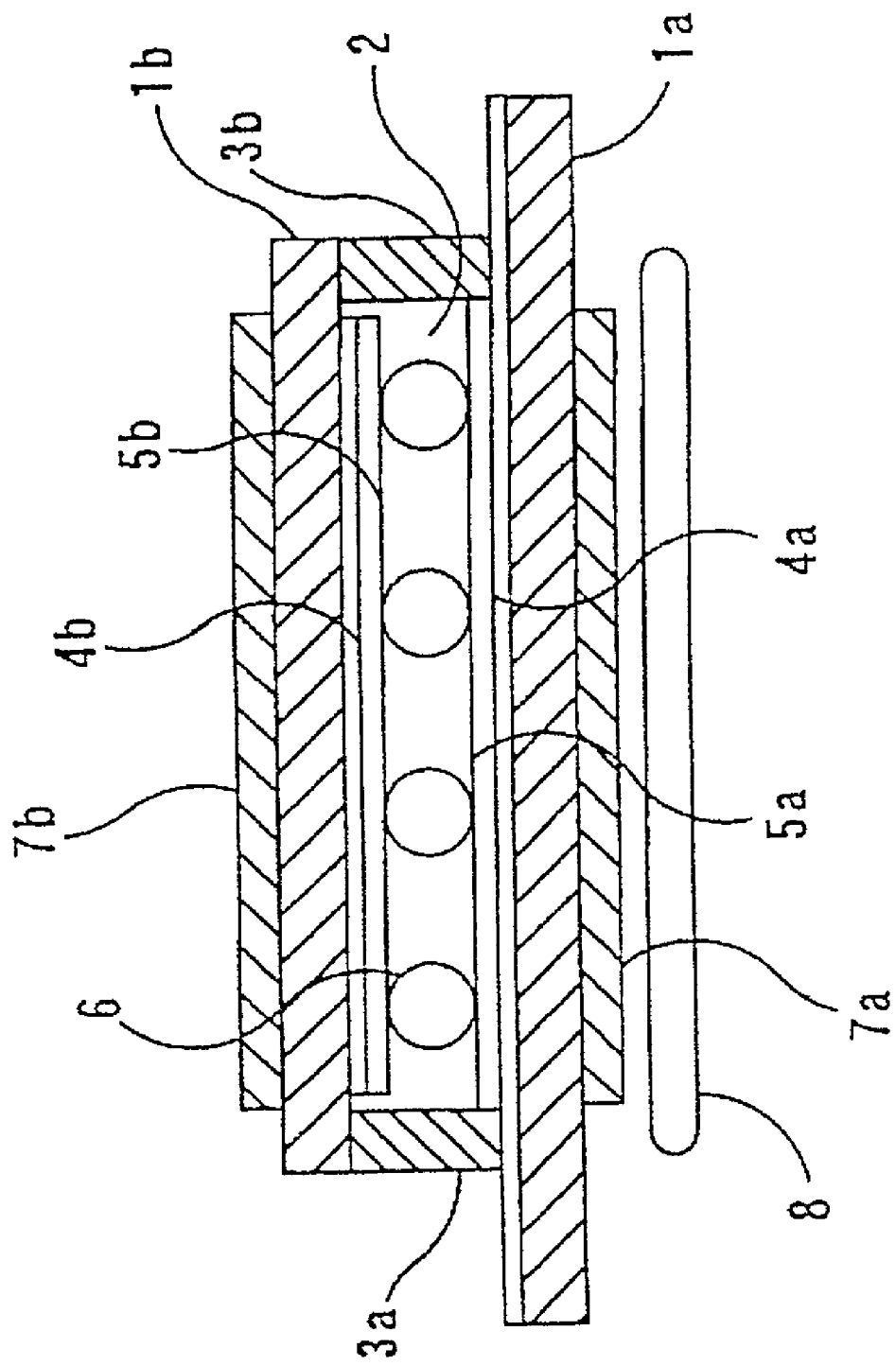
FIG. 1 is a schematic view showing a liquid crystal device of the present invention.

FIG. 1 shows a liquid crystal device of the present invention. In the liquid crystal device of the present invention shown in FIG. 1, liquid crystal molecules 2 are filled between glass substrates 1a and 1b, which are arranged to oppose to each other, sealing materials 3a and 3b are disposed at the both end portions of the glass substrates 1a and 1b so that the liquid crystal molecules 2 filled between the glass substrates 1a and 1b cannot leak therefrom. Thus, an optical cell is formed. As a material of the glass substrates 1a and 1b, alkaline glass such as sodalime glass, borosilicated glass, alumino borosilicated glass, silica glass, nonalkaline glass including sapphire glass and the like can be enumerated. Herein, any glass can be used in the present invention as long as it is: (1) transparent; (2) homogeneous and not size-dependent; (3) heat resistant; and (4) chemically stable.

As the foregoing sealing materials 3a and 3b, any material that has been heretofore known can be used. Specifically, for example, a thermosetting resin such as an epoxy resin, an ultraviolet curing resin or the like can be enumerated. However, in the present invention, any resin material other than these materials can be used as long as it can provide appropriate characteristics.

Description will be further made for the liquid crystal device of the present invention with reference to FIG. 1. On the sides of the substrates 1a and 1b, which face to the liquid crystal molecules 2, transparent electrodes 4a and 4b are formed to have a constitution in which an electric field can be applied to the liquid crystal molecules 2. The transparent electrodes 4a and 4b can be constituted of various materials. Specifically, metal and metal oxide such as ITO, ATO, IZO, $SnO_2$ and $In_2O_3$ can be enumerated. However, from the viewpoint of transparency and coloring property, it is preferable to use ITO. Moreover, the transparent electrodes 4a and 4b can be formed by any method such as evaporation, sputtering, and CVD, and specifically, DC magnetron sputtering, as long as it can be applicable.

On the side of the each above-described transparent electrodes 4a and 4b, which face to the liquid crystal molecules, carbon films 5a and 5b for binding the liquid crystal molecules to provide an alignment property thereto are formed. In the present invention, the carbon films 5a and 5b are made to be carbon films formed by the DC magnetron sputtering in the inert gas atmosphere. The inert gas used in the present invention includes a so-called rare gas such as He, Ne, Ar, Kr, Xe and any mixture thereof. In addition, in the present invention, the inert gas can be used by adding a chemically inert gas such as a nitrogen gas other than the above-described gases if necessary. Moreover, in the liquid crystal device of the present invention shown in FIG. 1, a state is shown, where spacers 6 maintain a space between the glass substrates 1a and 1b. In the liquid crystal device shown in FIG. 1, switching elements such as TFTs (not shown) are further formed, and these components are arranged between polarizing plates 7a and 7b opposing to each other. A constitution is made so as to function as a display element by light provided by a backlight 8 and the liquid crystal molecules 2, which are aligned by the electric field applied to the glass substrates 1a and 1b. Furthermore, in the liquid crystal device of the present invention shown in FIG. 1, a color filter (not shown) for a color display can be also used.

As the liquid crystal molecules 2 that can be used in the present invention, a twisted nematic type, a super twisted nematic type, cholesteric type and the like can be enumerated. Various chiral additives and dyes are added so as to impart a desired property to the liquid crystal molecules 2.

Figure 2:
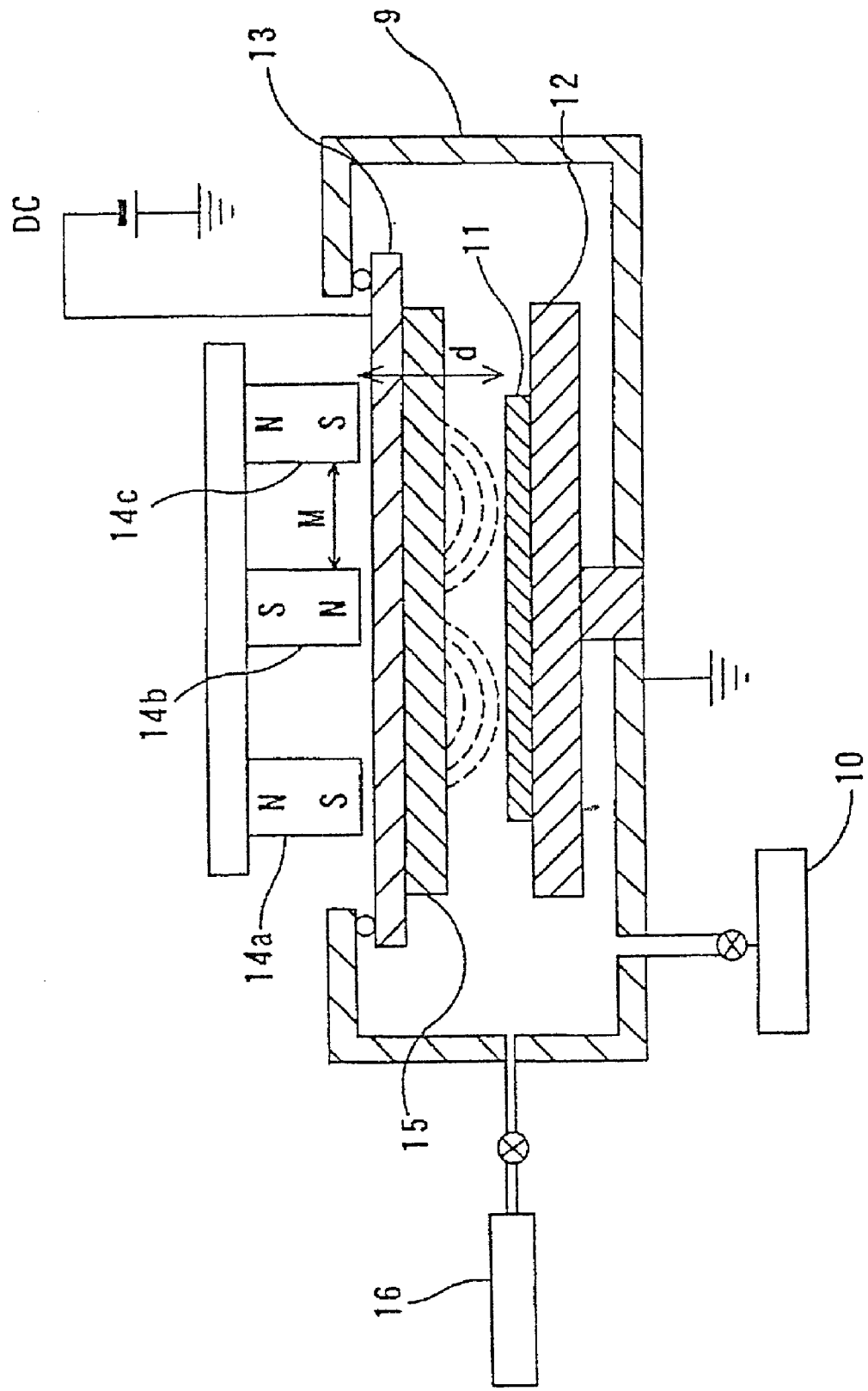
FIG. 2 is a schematic view showing a manufacturing apparatus of the liquid crystal device of the present invention.

FIG. 2 shows an apparatus for manufacturing the carbon films 5a and 5b used in the liquid crystal device of the present invention as an alignment film. The apparatus shown in FIG. 2 is constituted by including: a chamber 9 for depositing the carbon films 5a and 5b; an exhaust apparatus 10 for exhausting the chamber 9; substrate holding means 12 for holding a substrate 11, on which the carbon film is accumulated, while moving the substrate 11; a target attaching portion or a target backing plate 13; and magnets 14a, 14b and 14c adjacent to the chamber 9 and disposed outside the chamber 9. A heater (not shown) may be provided to the substrate holding means 12 so as to improve efficiency of deposition. The substrate holding means 12 may be designed to make a rotating or translation motion so as to be able to perform deposition uniformly onto the substrate 11.

The target backing plate 13 is insulated from the chamber 9 by appropriate means. A direct current (DC) power source is connected to the target backing plate 13, and a constitution is adopted such that plasma is generated by an electric discharge, and a material of a target 15, which is attached to the target backing plate 13, is sputtered. The target 15 can be used that made of sintered carbon. To the manufacturing apparatus of the liquid crystal device of the present invention shown in FIG. 2, a gas supply source 16 is connected for supplying a carrier gas of an appropriate inert gas such as Ar.

A structure giving appropriate alignment to the molecules of the liquid crystal molecules 2 is imparted to the carbon film used as an alignment film of the present invention by manufacturing the carbon film under an inert gas atmosphere that does not contain any components such as an N element, an O element, hydrogen ($H_2$) and a hydrocarbon compound. The carbon film formed by the manufacturing apparatus of the present invention does not particularly specify a definite structure, but may specify any structure such as graphite, an amorphous carbon film, a single crystal or polycrystalline carbon film, diamond-like carbon (DLC) and mixtures of these structures. In addition, FIG. 2 shows a state where the chamber 9 and the substrate holding means 12 are grounded, but the substrate holding means 12 is not necessarily grounded in the present invention.

In the manufacturing apparatus of the liquid crystal device of the present invention shown in FIG. 2, the magnets 14a, 14b and 14c are arranged alternately such that polarities of the magnets adjacent to each other become reverse. Thus, the magnets 14a, 14b and 14c apply magnetic fields shown by dashed lines in FIG. 2 to DC magnetron discharge plasma, and adhere the carbon film onto the substrate 11 having the transparent electrode already formed thereon such as a glass substrate under the function of the magnetic fields.

As the magnets 14a, 14b and 14c used in the manufacturing apparatus of the liquid crystal device of the present invention shown in FIG. 2, magnets having a magnetic flux density of about 0.01 T to 0.2 T can be applied. It is preferable to use magnets having a magnetic flux density of about 0.02 T to 0.15 T in consideration of handling and the alignment property of the carbon film to be deposited, and it is more preferable to use magnets having a magnetic flux density of about 0.025 T to 0.1 T in order to obtain the carbon film exhibiting an alignment effect. A permanent magnet can be used as such a magnet, and an electro-magnet can be also used if necessary.

In the manufacturing apparatus of the liquid crystal device of the present invention, the foregoing magnets 14a, 14b and 14c need to apply magnetic fields to the substrate 11 in order to impart an appropriate alignment property to the carbon film to be deposited. Therefore, spaces among the magnets 14a, 14b and 14c and arrangement thereof to the substrate 11 affect the alignment property. Specifically, when a space M between the magnets is large and a distance from the magnets 14a, 14b and 14c to the substrate 11 is long, it is impossible to apply the magnetic fields to the substrate sufficiently. On the contrary, when the distance from the magnets 14a, 14b and 14c to the substrate 11 is too short, a distance from the substrate 11 to the target 15 also becomes short. Thus, a problem such as an arcing occurs, making it impossible to perform good deposition.

From the above-described viewpoint, it is preferable that the space M between the magnets and the distance d from the magnets to the substrate satisfy the following equation (1).

Equation 1

$$0.58 \leq M/d \leq 3 \quad (1)$$

Figure 3:
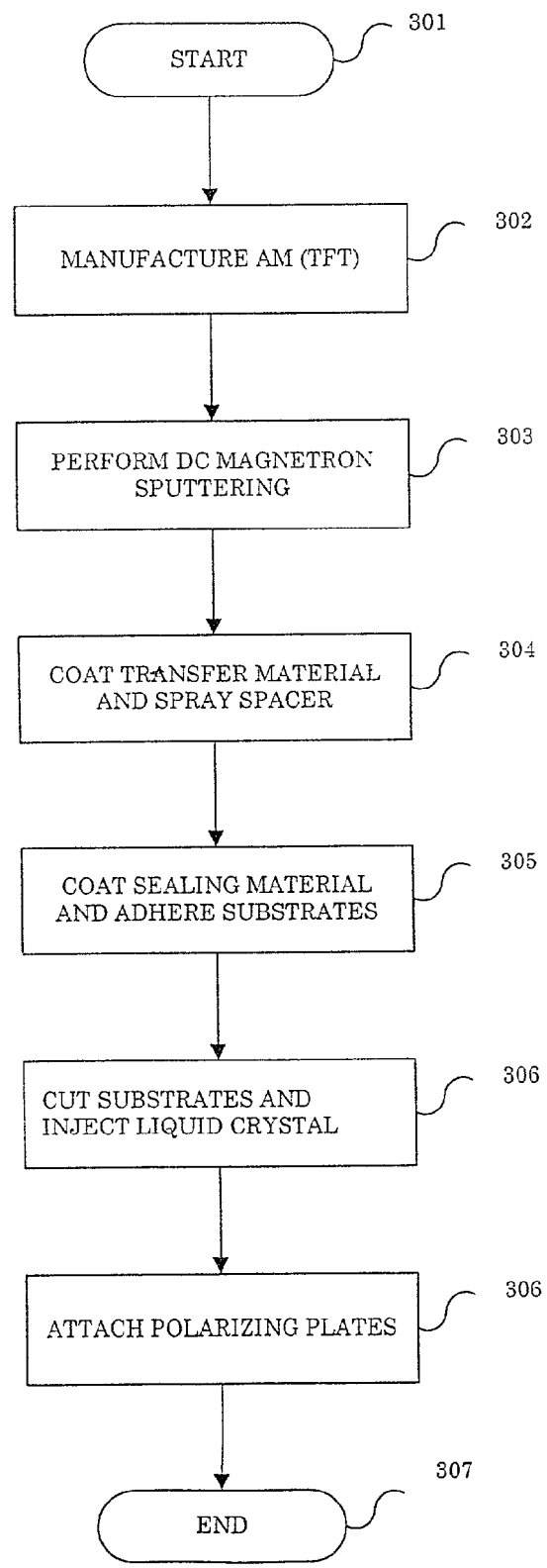
FIG. 3 is a flowchart showing a manufacturing method of the liquid crystal device of the present invention.

Hereinbelow, the manufacturing method of a liquid crystal device of the present invention will be described in detail with reference to FIG. 3. FIG. 3 shows a flow-chart of the manufacturing method of the liquid crystal device of the present invention by taking an active matrix type liquid crystal display as an example. The manufacturing method of the liquid crystal device of the present invention starts from step 301. In step 301, a substrate (AM (TFT) substrate) is provided, on which active matrix type transistors (TFTs) are formed. Subsequently in step 302, by use of the DC magnetron sputtering method, the carbon film used as an alignment film is formed.

Next, in the manufacturing method of a liquid crystal device of the present invention, in step 303, coating a transfer material and disposing of spacers on the thin film transistor are carried out, and in step 304, a sealing material is applied, the AM (TFT) substrate is combined to an opposing substrate having a color filter or the like formed thereon, and then the sealing material is cured. Thereafter, in step 305, the both substrates are cut, the liquid crystal are injected therebetween, and an injection port is sealed in step 305, then the polarizing plates are applied in step 306. In step 307, manufacturing of a panel for the liquid crystal device is terminated.

Hereinbelow, description will be made in detail for a manufacturing process of the carbon film that can be used as an alignment film without further alignment processing, by using the DC magnetron sputtering method shown in the manufacturing method in FIG. 3. In the DC magnetron sputtering method shown in the manufacturing method in FIG. 3, first, the substrate 11 is mounted on the substrate holding means 12 in the chamber 9 of the manufacturing apparatus shown in FIG. 2, and the exhaust apparatus 10 is activated to exhaust the inside of the chamber 9 after making the chamber 9 airtight. Subsequently, after an appropriate carrier gas such as Ar is supplied into the chamber 9 to set the inside thereof at an appropriate pressure, an electric current is supplied from a DC power source to generate a DC magnetron discharge. Then, active species containing C elements are formed from the target arranged in the chamber 9. Thus, deposition is performed under the force of the magnetic fields by the sputtering magnets.

At this time, as the conditions of the DC magnetron sputtering, for example, a sintered carbon target is used as the target, Ar is used as the carrier gas, the pressure is set at 0.5 Pa to 2 Pa, and the output is set at 1 kW to 2 kW. In this case, it is preferable that the deposition is performed in the inert gas atmosphere such as He, Ne, Ar, Kr and Xe. Moreover, in such a deposition process, the substrate 11 held by the substrate holding means 12 may be moved by allowing the substrate holding means 12 to make the reciprocal motion or the translation motion in one direction in order to deposit the carbon film uniformly on the substrate 11.

In order to form the carbon film which has the sufficient alignment property and is excellent in the optical characteristics, conditions for the DC magnetron sputtering can be set with a necessary time, an output of the DC power source and a carrier flow rate. In the present invention, the above-described carbon film was found to satisfy both of the required alignment property and optical characteristic in the thickness of 250 nm or less, more specifically at least with the film thickness range of 0.3 nm to 250 nm. More specifically, from the viewpoint of the stability and the optical characteristic of deposition, the film thickness is preferably set in the range of 0.3 nm to 100 nm, particularly 0.3 nm to 50 nm.

Hereinbelow, the present invention will be described by use of a detailed example. However, the present invention is not limited to the following example.

EXAMPLE

The liquid crystal device of the present invention shown in FIG. 1 was formed by deposition of the carbon film as an alignment film, by means of the DC magnetron sputtering method, the formation being performed by the manufacturing apparatus shown in FIG. 2. Examination was made for the alignment property, the electro-optical characteristic, the relation between the alignment and film quality, and the dependency on a film thickness.

Hereinbelow, typical conditions for the DC magnetron sputtering are shown.

Target: sintered carbon target
    Carrier gas: Ar at a pressure of 1 Pa
    DC discharge output: 1 kW
    Space between magnets: 6 cm
    Distance from magnet to substrate: 5 cm
    Magnetic flux density of magnets: 0.0250 T Fabrication of Liquid Crystal Device The liquid crystal device having a cell gap of 5 micrometers was formed by use of the carbon film as an alignment film with a film thickness of about 10 nm. The film was formed under the conditions as described above. The liquid crystal device was manufactured in such a manner that liquid crystal molecules of a twisted nematic type, which have chiral pitches of 18 micrometers and 100 micrometers, that is, MJ971189 manufactured by Merck & Co. Ltd., is injected between the optical cells, heated to the nematic-isotropic (NI) point or more, and thereafter, cooled to be set in the amorphous alignment state.

Moreover, as a comparative example, the liquid crystal device having chiral pitches of 18 micrometers and 100 micrometers was manufactured similarly to the above-described liquid crystal device except for that a polyimide film (hereinafter, referred to as PI) was used as an alignment film and no rubbing was performed.

Optical Characteristics of the Carbon Alignment Film in Comparison with the PI Alignment Film In the case where the liquid crystal molecules are not aligned, the liquid crystal molecules are randomly aligned relative to an alignment film, and twisted angles thereof are determined according to the chiral pitches. In the case where the carbon film does not have the alignment property, the liquid crystal molecules have the twisted angles of about 90 degrees if a cell gap is 5 micrometers with the chiral pitch of 18 micrometers. Generally, since birefringence of liquid crystal n (ne-no) is designed such that a first minimum value corresponds to a wavelength of 550 nm, green is absorbed and liquid crystal device is colored in bluish magenta when observed through the parallel Nicols. When the chiral pitch is 100 micrometers, a twisted angle is about 18 degrees for the cell gap of 5 micrometers, therefore, visible light ranging from 380 nm to 780 nm generally transmits through the parallel Nicols, and the liquid crystal device is not colored.

Figure 4:
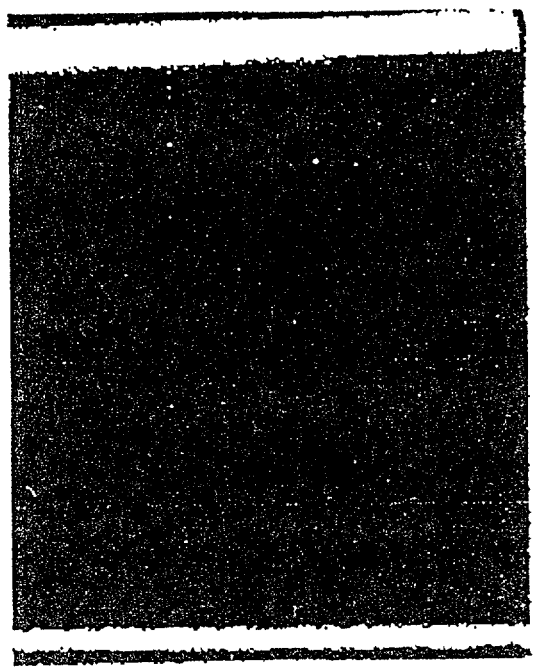
FIGS. 4(a) and 4(b) are pictures showing the optical characteristics of the liquid crystal device of the present invention.
Figure 4:
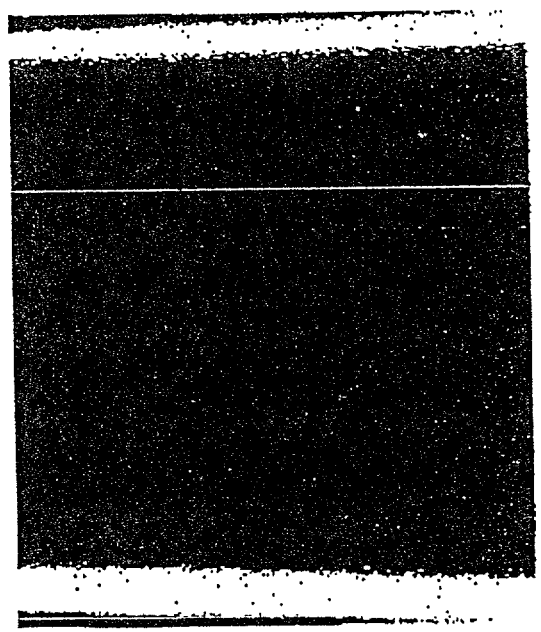

FIG. 4 shows the optical characteristics of the liquid crystal device of the present invention under the parallel Nicols. FIG. 4(*a*) is a picture showing the optical characteristics obtained with regard to a sample having the chiral pitch of 18 micrometers. FIG. 4(*b*) is a picture showing the optical characteristics obtained with regard to a sample having the chiral pitch of 100 micrometers. Both pictures show they were most intensely colored by changing the angle between the substrate and the polarizing plate. As shown in FIG. 4, in the embodiment where the carbon film is made to be an alignment film according to the present invention, bluish coloring was observed for both samples despite that no separate step for alignment process was particularly performed for the carbon film. When the sample with the chiral pitch of 100 micrometers was observed under the parallel Nicols, green was absorbed, and the sample is colored in a bluish color. Accordingly, it is shown that the carbon film manufactured according to the present invention has the alignment property without any particular alignment process carried out.

Moreover, when two pairs of polarizing plates were made to be crossed Nicols and the cell was rotated between the polarizing plates to observe a color change, it was confirmed that transmitted color was changed depending on extinction axes of the polarizing plates and a cell angle. When the liquid crystal molecules are not aligned and in the amorphous state, the color dose not change with the angles. Therefore, it can be seen that the liquid crystal molecules are aligned by the carbon film of the present invention. As described above, because there is no color difference between the samples shown in FIG. 4(*a*) and FIG. 4(*b*), and from the result of observation of a morphology under a polarization microscope, it is considered that the carbon film of the present invention already has a structure of the alignment property at the deposition stage.

Figure 5:
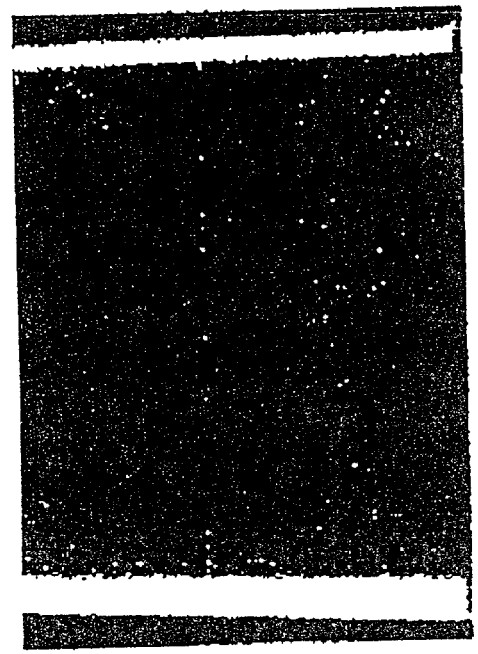
FIGS. 5(a) and 5(b) are pictures showing the optical characteristics of the liquid crystal device in which the alignment film of PI without alignment process is applied.
Figure 5:
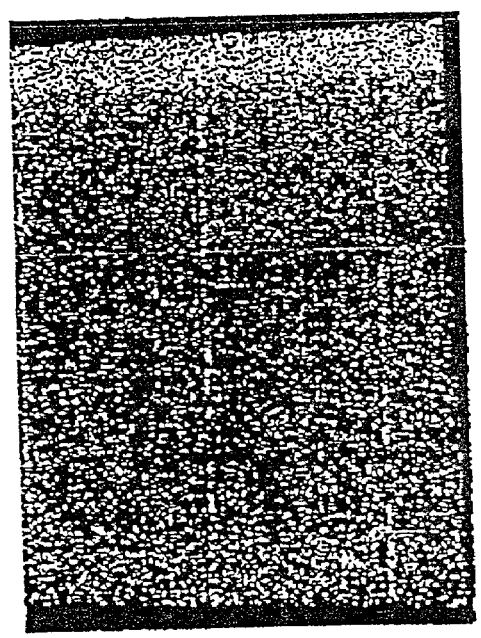

FIGS. 5(*a*) and 5(*b*) show the optical characteristics of liquid crystal devices fabricated as comparative examples. In this case, although alignment processing is not performed for PI, amorphous alignment is given to PI by performing appropriate anneal processing. In observation under the parallel Nicols, a sample with the chiral pitch of 18 micrometers was colored in bluish magenta as shown in FIG. 5(*b*), but a sample with the chiral pitch of 100 micrometers was not colored as shown in FIG. 5(*a*) because light was transmitted through the parallel Nicols. According to the result of these comparative examples, it is also confirmed by the optical characteristics of the liquid crystal device that the carbon film of the present invention has a structure of the alignment property at the time of deposition.

Electro-Optical Characteristics

Electro-optical characteristics of the liquid crystal device of the present invention was compared with that of the liquid crystal device fabricated by using PI without alignment processing. Liquid crystal material used here is a twisted nematic type liquid crystal molecules named MJ971189 having the chiral pitch of 18 micrometers, and the cell gap was set at 5 micrometers. The liquid crystal device was fabricated as follows. The liquid crystal molecules were injected into the cell, cooled down after being heated to the NI point or more to be set as an amorphous state. For the liquid crystal device using the carbon film of the present invention, the liquid crystal molecules were subjected to amorphous alignment by setting the heating condition at 130 degrees centigrade and 160 degrees centigrade, the samples obtained are denoted as carbon films 130 and 160, respectively. Moreover, for the purpose of comparison, a measurement was performed for a sample fabricated by using PI with no alignment treatment. Furthermore, a liquid crystal device using ITO with no alignment treatment was fabricated as a comparative example in order to examine influence of ITO that is a transparent electrode under the PI. Note that Table 1 shows characteristics regarding PI with alignment process as a reference.

Figure 6:
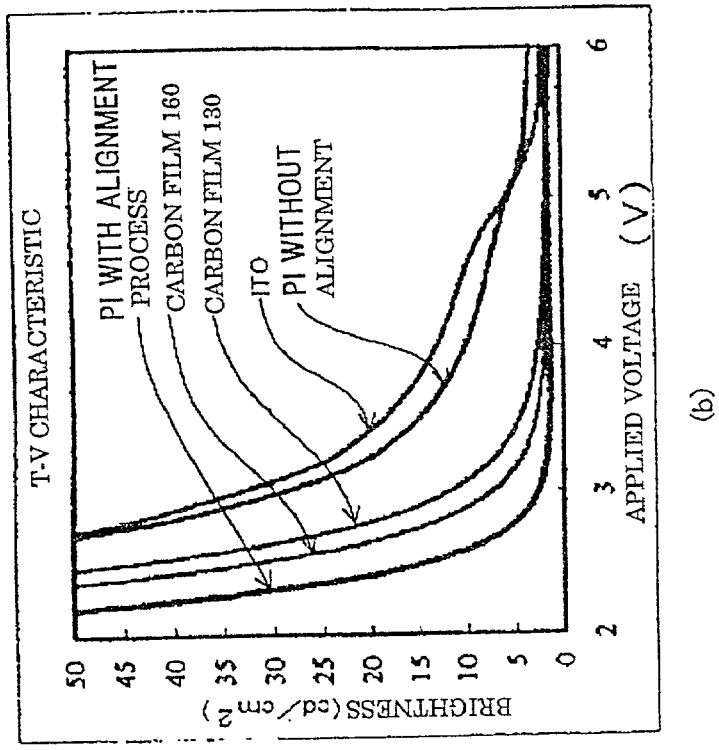
FIGS. 6(a) and 6(b) are graphs showing the electro-optical characteristics of the liquid crystal device of the present invention and a liquid crystal device of a comparative example.
Figure 6:
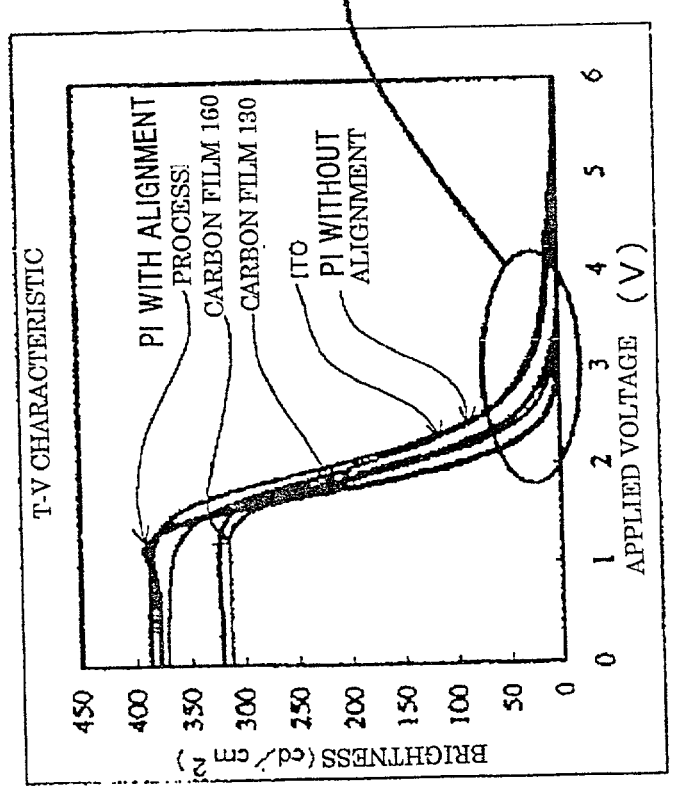

FIGS. 6(a) and 6(b) show transmission vs. applied voltage characteristics of each sample described above. FIG. 6(a) is a figure showing transmission vs. applied voltage characteristics, and FIG. 6(b) is a figure showing a portion of FIG. 6(a) by enlarging it. As shown in FIGS. 6(a) and 6(b), although the liquid crystal device of the present invention has transmission a little lower at a low applied voltage, it shows a sufficient contrast ratio for the applied voltage. The result shown in FIGS. 6(a) and 6(b) are summarized in Table 1.

Note that, in the amorphous alignment cell using PI, there exist grains with the size of a few tens of micrometers, of which alignment orientation is different from each other by a little amount. Deterioration of the black level that is, a light leakage was observed. This will not be observed in the cell where rubbing with a single alignment is carried out. The light leakage is attributed to disclination lines generated at the grain boundaries. On the contrary, the liquid crystal cell using the carbon film of the present invention had a less deterioration at the black level, and the disclination lines were not observed even with a microscopic observation. In other words, the liquid crystal device of the present invention exhibited the characteristics equivalent to the one subjected to alignment process of PI in a single direction electro-optically.

TABLE 1

|  | PI (alignment process) | Carbon film 160 | Carbon film 130 | ITO | PI |
|---|---|---|---|---|---|
| CR (6 V) | 301.0 | 205.5 | 231.7 | 117.9 | 193.9 |
| CR (5 V) | 298.6 | 192.8 | 194.0 | 64.3 | 70.5 |
| V90 | 1.471 | 1.601 | 1.65 | 1.496 | 1.605 |
| V50 | 1.802 | 1.979 | 2.039 | 2.029 | 2.073 |
| V1O | 2.281 | 2.534 | 2.631 | 2.943 | 2.846 |

In table 1, with regard to the above-described samples, a contrast at 6V, a contrast at 5V, and voltages at the transmissions of 10%, 50% and 90%, respectively, are summarized. As shown in Table 1, the contrast at 5V is less than 100 in the case of the samples where PI and ITO were used without the alignment processing. On the other hand, the liquid crystal devices using the carbon films of the present invention indicate values close to 200, and the carbon films of the present invention evidently have the alignment property, and it shows that the contrast ratio is sufficient for practical use. Moreover, it can be seen, according to the transmission data as well, that the liquid crystal devices of the present invention show characteristics sufficient for practical use.

Relation Between Alignment Property and Film Quality

In order to confirm the effect of $H_2$, the carbon film was deposited by sputtering in an atmosphere containing $H_2$, and the carbon film containing about 30 at % of H was formed. The cell was fabricated using the carbon film without alignment processing directly, and the liquid crystal having the chiral pitch of 18 micrometers was injected to fabricate the liquid crystal device similarly to the above-described samples, thus making a sample as a comparative example. In addition, a sample was fabricated by using the carbon film formed by the CVD method as an alignment film without rubbing processing, thus similarly making a comparative example.

Figure 7:
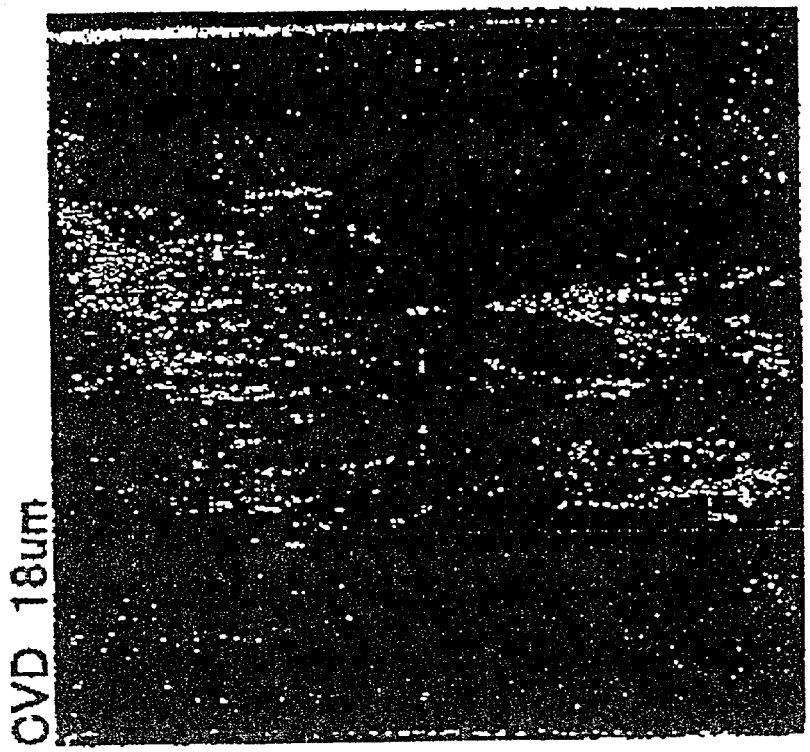
FIGS. 7(a) and 7(b) are pictures showing optical characteristics in the case where a hydrogenated carbon film formed by a DC magnetron sputtering method and a carbon film formed by a CVD method are made to be alignment films without further alignment process.
Figure 7:
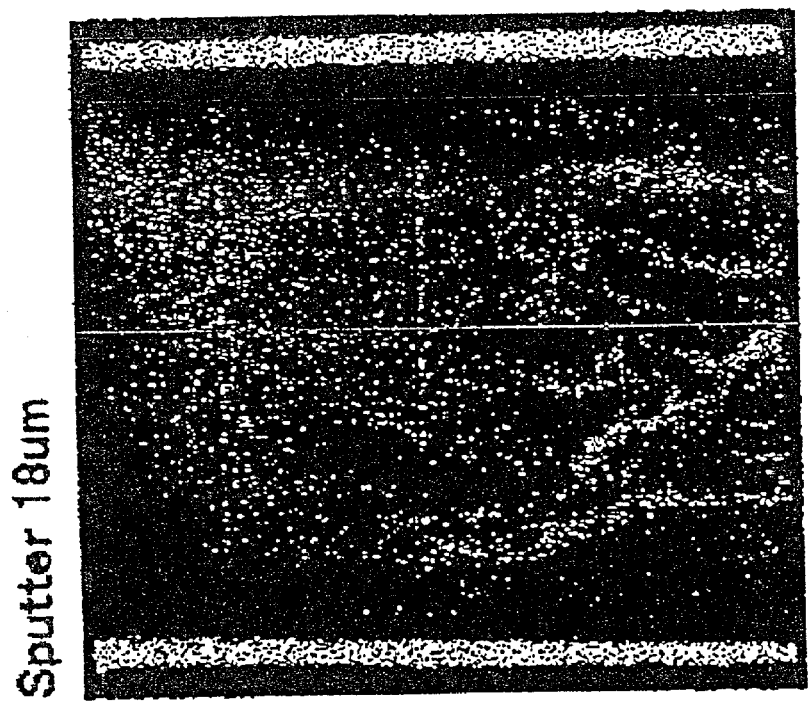

FIGS. 7(a) and 7(b) show observation results of the optical characteristics with regard to the respective comparative examples. FIG. 7(a) is a result of the case where the carbon film containing about 30 at % of H was used as an alignment film obtained by the DC magnetron sputtering method. FIG. 7(b) is a result of the case where the carbon film fabricated by the CVD method was used as an alignment film. As shown in FIGS. 7(a) and 7(b), it was found that the carbon film containing H did not show the alignment property even when fabricated by the DC magnetron sputtering method. Moreover, it can be seen that when the carbon film having a similar composition is formed by the CVD method, no alignment property is exhibited as well.

Influence by Film Thickness of Carbon Film

Figure 8:
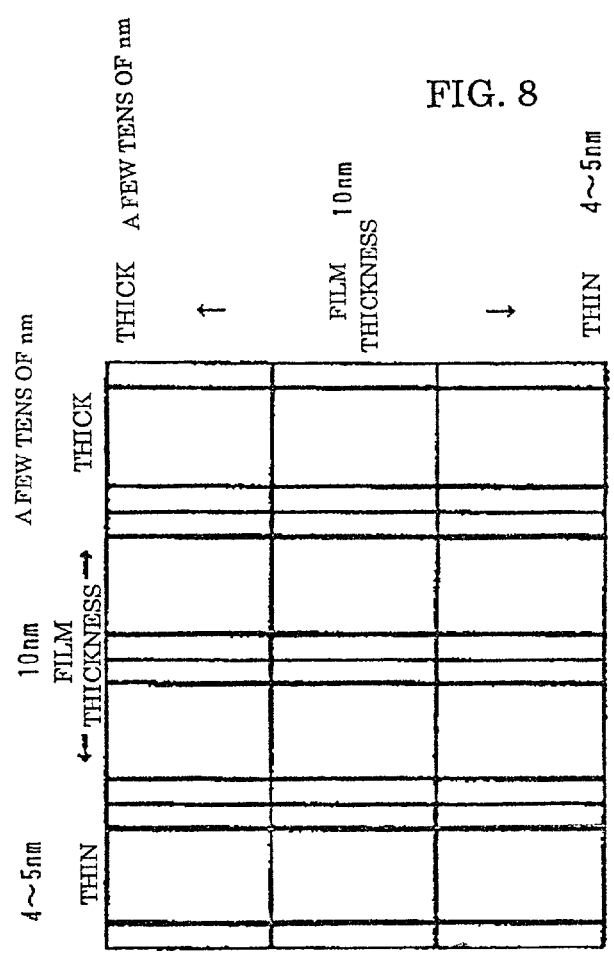
FIGS. 8(a) and 8(b) are views showing dependency of the optical characteristics on film thickness of the carbon film used as an alignment film for the liquid crystal device of the present invention.
Figure 8:
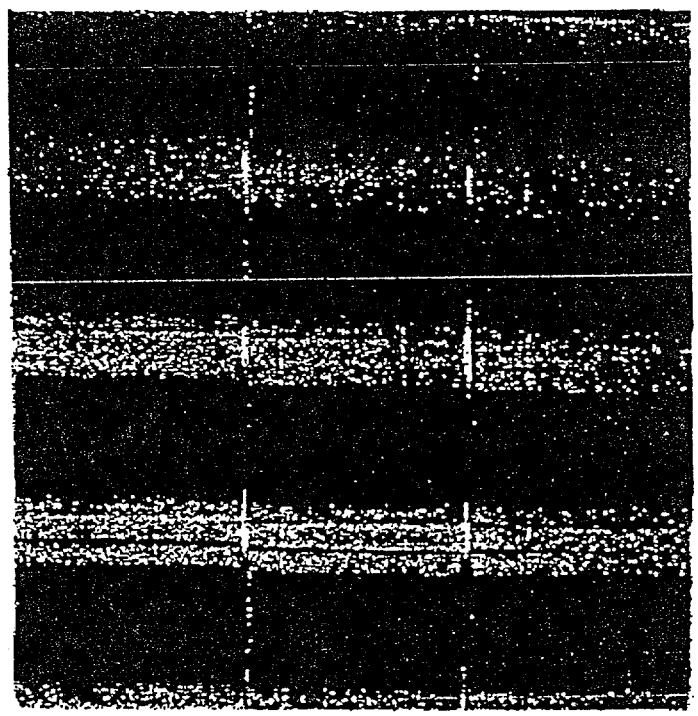

FIGS. 8(a) and 8(b) are views showing examination results of dependency of the alignment property on the film thickness having a distribution. In this case, the carbon film was deposited in a state where the substrate was not moved but stopped. In the liquid crystal device shown in FIGS. 8(a) and 8(b), the liquid crystal molecules having the chiral pitch of 100 micrometers were used. FIG. 8(a) shows an observed coloring state, and FIG. 8(b) shows a distribution in film thickness. As shown in FIG. 8(a), the coloring characteristics were hardly changed in spite of the difference in the film thickness. Accordingly, it is considered that the alignment film using the carbon film of the present invention has sufficient allowance for the film thickness at the time of manufacturing.

Identification of Reference Numerals is Repeated herein for Convenience:

1a, 1b . . . GLASS SUBSTRATE
2 . . . LIQUID CRYSTAL MOLECULES
3a, 3b . . . SEALING MATERIAL
4a, 4b . . . TRANSPARENT ELECTRODE
5a, 5b . . . CARBON FILM
6 . . . SPACER
7a, 7b . . . POLARIZING PLATE
8 . . . BACKLIGHT
9 . . . CHAMBER
10 . . . EXHAUST APPARATUS
11 . . . SUBSTRATE
12 . . . SUBSTRATE HOLDING MEANS
13 . . . TARGET BACKING PLATE
14a, 14b and 14c . . . MAGNET
15 . . . TARGET
16 . . . GAS SUPPLY SOURCE Having described embodiments of a system and method for forming an alignment film for LCD, it is noted that modifications and variation can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims

What is claims is:
1. A liquid crystal device, comprising:
substrates opposing to each other, at least one of which includes an electrode;
an optical cell formed between said substrates;
liquid crystal molecules filled in said optical cell; and a carbon film deposited on a side of at least one of said substrates, which is exposed to said liquid crystal molecules, to align said liquid crystal molecules, wherein said carbon film comprises an alignment property imparted by sputter depositing a sintered carbon in a magnetic field and inert gas atmosphere to form said carbon film.

2. A liquid crystal device according to claim 1, wherein said inert gas is He, Ne, Ar, Kr, Xe or a mixture of any thereof.

3. A liquid crystal device according to claim 1, wherein said carbon film has a thickness of 250 nm or less.

4. A liquid crystal device according to claim 2, wherein said carbon film has a thickness of 250 nm or less.

5. A liquid crystal device according to claim 1, wherein the substrates are formed using an alkaline glass material.

6. A liquid crystal device according to claim 1, wherein the substrates are formed using a nonalkaline glass material.

7. A liquid crystal device according to claim 1, wherein the electrode is formed using a transparent conductive material.

8. A liquid crystal device according to claim 1, further comprising spacers disposed between the substrates.

9. A liquid crystal device according to claim 1, further comprising polarizing plates disposed adjacent to the substrates.

10. A liquid crystal device according to claim 1, further comprising a color filter.

11. A liquid crystal device according to claim 1, further comprising a backlight device.

12. A liquid crystal device according to claim 2, wherein said carbon film has a thickness in a range of about 0.3 nm to about 100 nm.

* * * * *